United States Patent [19]

Milliken

[11] 3,890,770

[45] June 24, 1975

[54] HAY CONDITIONER ROLL

[75] Inventor: Paul E. Milliken, Massillon, Ohio

[73] Assignee: The Goodyear Tire & Rubber Company, Akron, Ohio

[22] Filed: Feb. 28, 1974

[21] Appl. No.: 446,975

[52] U.S. Cl. .................. 56/1; 56/DIG. 1; 130/5 R
[51] Int. Cl. ........................................ A01d 73/00
[58] Field of Search ............ 56/DIG. 1, 1, 104, 110; 130/5 J, 5 R

[56] References Cited
UNITED STATES PATENTS

| | | | |
|---|---|---|---|
| 1,417,356 | 5/1922 | Smith | 56/DIG. 1 |
| 3,146,568 | 9/1964 | Mayer | 56/DIG. 1 |
| 3,732,670 | 5/1973 | Milliken et al. | 56/DIG. 1 |

*Primary Examiner*—Louis G. Mancene
*Assistant Examiner*—J. N. Eskovitz
*Attorney, Agent, or Firm*—F. W. Brunner; P. E. Milliken

[57] ABSTRACT

A molded rubber roll for use in conjunction with one or more additional rolls of similar construction on a hay conditioning machine. The roll has a cylindrical peripheral intermediate surface with a plurality of rows of integral lugs extending radially outwardly therefrom and a plurality of rows of depressions extending radially inwardly therefrom. When a pair of such rolls are mounted in parallel relationship on a hay conditioning machine, the intermediate surfaces of the rolls are in continuous rolling contact as the rolls rotate and the tops of the lugs of each roll contact the bottoms of the depressions in the opposite roll, thereby forming three different levels of crushing surfaces which crush the hay as it passes between the rotating rolls. The lugs and depressions are preferably circular shape but may be molded in other shapes such as diamonds, hexagons, rectangles and the like. The rolls are normally molded or splined to a metal shaft which in turn is rotatably mounted on the hay conditioner machine.

12 Claims, 13 Drawing Figures

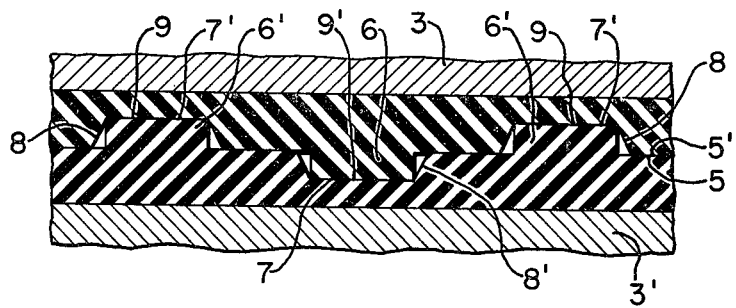
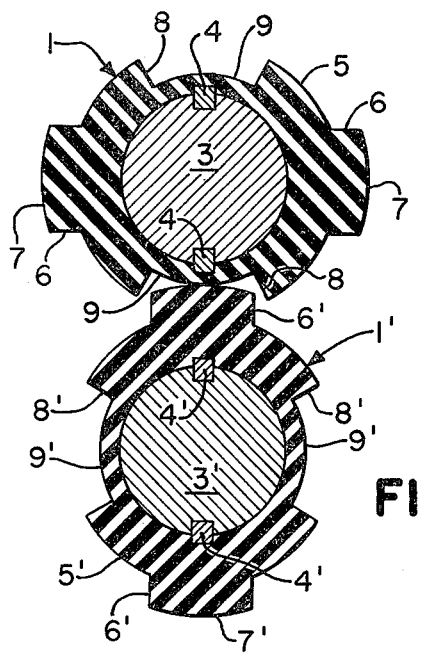
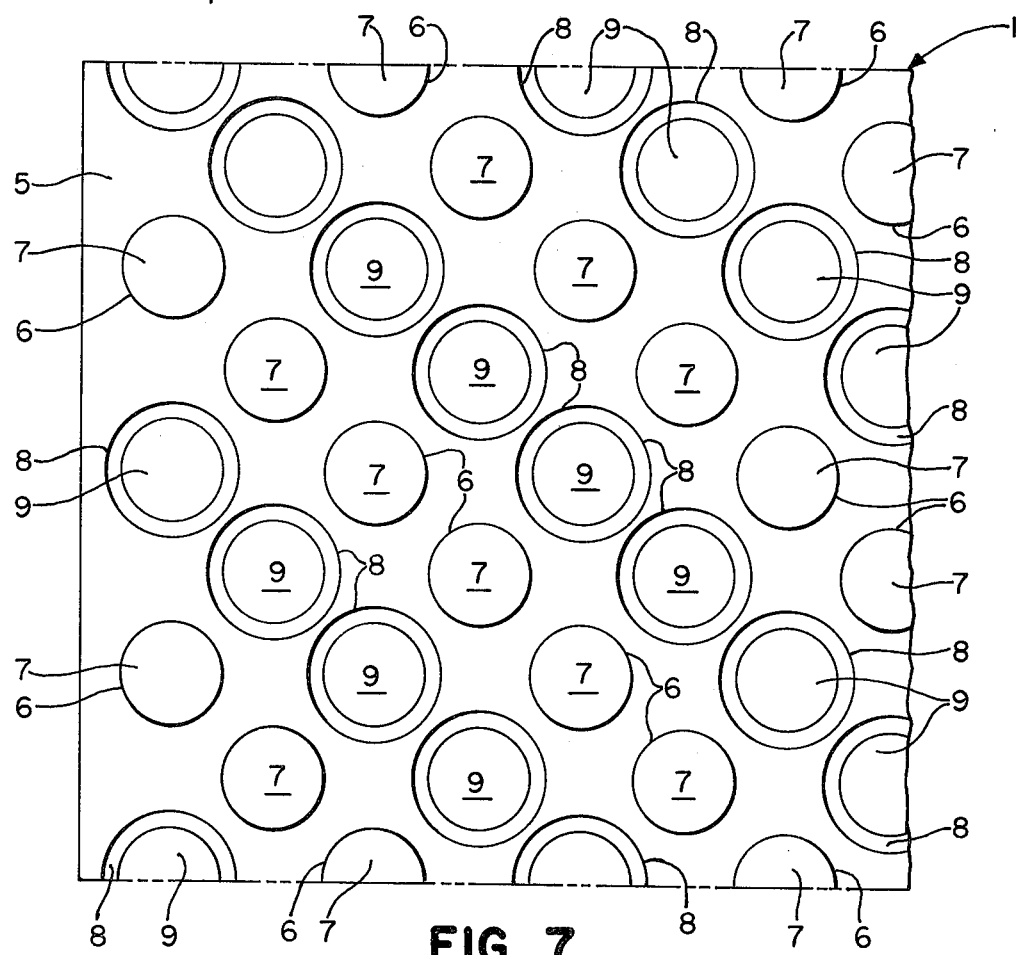

HAY CONDITIONER ROLL

This invention relates to a molded rubber roll for use in conjunction with one or more additional rolls of similar construction on a hay conditioning machine.

BACKGROUND OF THE INVENTION

Various types of rolls have been used on crop conditioning machines in the past. The earlier rolls were made of metal and the more recent rolls have been made of molded rubber construction. Hay conditioner rolls have been made with many types of surface configurations such as ribs, grooves and other types of surface variations in an attempt to better perform the function of crimping and/or crushing hay or other similar crops passing between a pair of such rolls. Two of the main problems encountered by prior art devices have been that of excessive vibration and the tendency of the crop to be carried to one end of the rolls while passing therethrough and become wrapped around the shaft which carries the rolls.

PRIOR ART

The closest prior art known to Applicant is Applicant's prior U.S. Pat. No. 3,732,670 and U.S. Pat. No. 3,146,568 issued to J. E. Mayer.

OBJECTS OF THE INVENTION

One important object of this invention is to provide a roll structure which both minimizes the vibration of the rolls and prevent axial movement of hay across the rolls thereby causing it to wrap around the shafts at the ends of the roller.

Another object of the invention is to provide a roll structure which uniformly crimps and crushes all parts of the hay or other crops being conditioned regardless of the stock diameter of leaf structure.

A further object of the invention is to provide a roll with a greater overall length of crimping edges than previous roll configurations.

A still further object of the invention is to provide a roll having three levels of crushing surfaces which act upon the crops being passed between the rolls.

Still another object of the invention is to provide a more durable roll having a surface configuration which is less subject to breakage and distortion.

These and other objects of the invention will become more fully apparent as the description proceeds in the following specification and the accompanying drawings.

BRIEF DESCRIPTION OF THE DRAWINGS

FIG. 5 is a cross-sectional view taken on line 5—5 of FIG. 1;

FIG. 6 is a fragmentary cross-sectional view taken in a substantially longitudinal direction of the rolls and showing a typical intermeshing relationship between the two rolls;

FIG. 7 is a flat development of the surface pattern of one of the rolls shown in FIG. 1;

DESCRIPTION OF THE PREFERRED EMBODIMENTS

Figure 1:
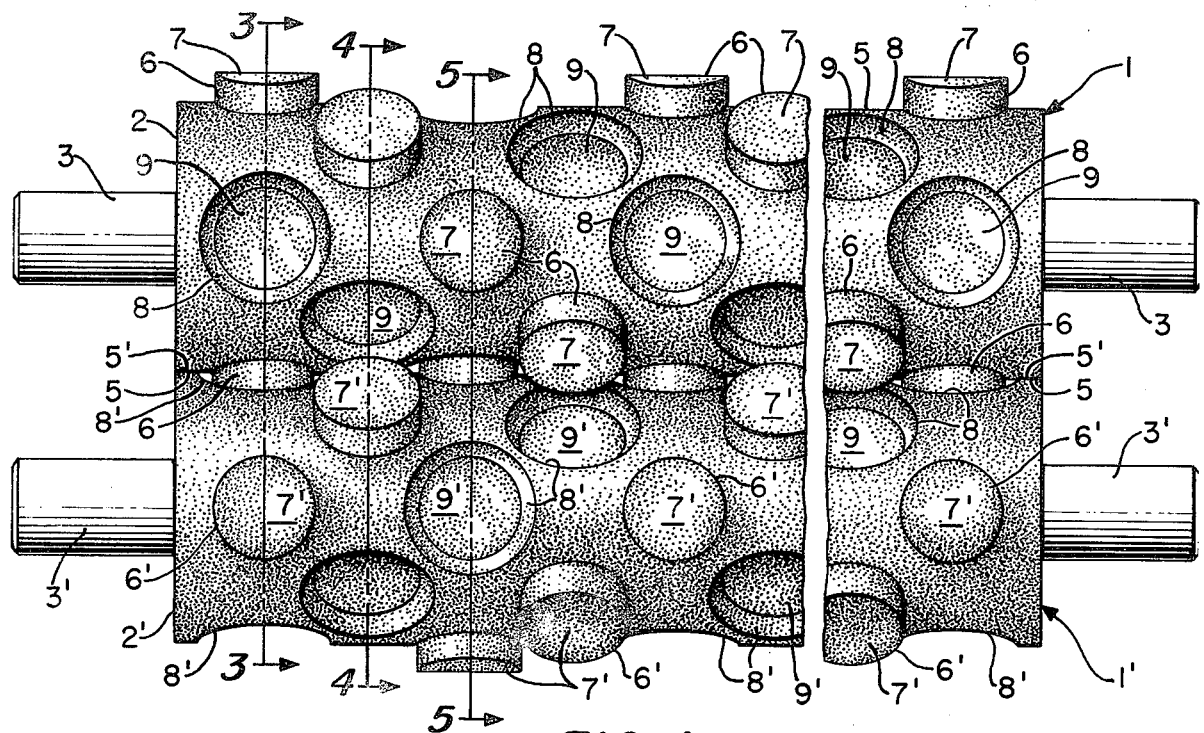
FIG. 1 is a side view of a pair of rolls showing one embodiment of the invention.
Figure 2:
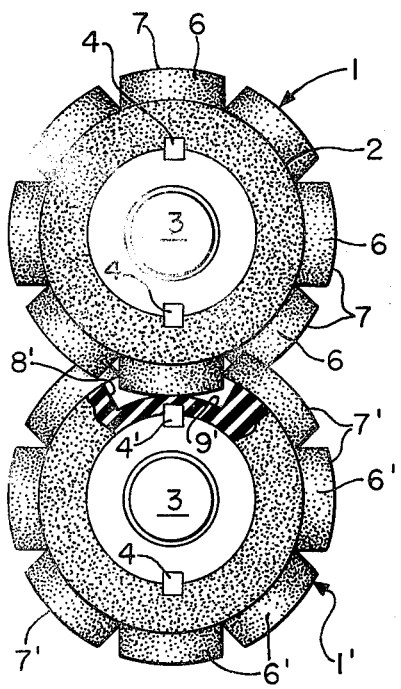
FIG. 2 is an end view of the embodiment shown in FIG. 1 with a portion broken away to show the intermeshing relationship of the two rolls.

Referring now to FIGS. 1 and 2, a pair of intermeshing rolls indicated generally by the numerals 1 and 1' have elongated cylindrical elastomeric body portions 2 and 2' which are respectively keyed on axial cores or shafts 3 and 3' by a pair of keys 4 and 4'. Since both of the rolls are substantially identical in construction, the similar parts will be identified by similar numerals for simplicity and in order to distinguish the upper roll from the lower roll the numerals identifying the parts of the lower roll will be followed by a prime (') designation. The body portions 2 and 2' have respectively cylindrical intermediate surfaces 5 and 5' which are in continuous rolling contact with each other when the rolls are mounted in operative parallel relationship and rotated about their axes. The roll 1 has a plurality of rows of circular lugs 6 extending radially outwardly from the intermediate surface 5 with each of the lugs 6 having a top surface 7. A plurality of rows of circular depressions 8 are located between the rows of circular lugs 6 and extend radially inwardly from the intermediate surface 5. Each of the depressions 8 has a bottom surface 9 which lies radially inwardly from the intermediate surface 5.

The roll 1', similar to the roll 1, has a plurality of rows of circular lugs 6' and a plurality of rows of circular depressions 8' with the lugs 6' having top surfaces 7' and the depressions having bottom surfaces 9'. As shown in FIGS. 1 and 2 when the rolls are placed in parallel intermeshing relationship as the rolls rotate about their axes, the lugs 6 of the roll 1 extend into the depressions 8' of the roll 1' and the lugs 6' of the roll 1'conversely extend into the depressions 8 in the roll 1. The top surfaces 7 contact the bottom surfaces 9' and the top surfaces 7' contact the bottom surfaces 9 to provide crop crushing action therebetween. Simultaneously, the intermediate surfaces 5 and 5' of the rolls 1 and 1' also provide continuous rolling contact which also provides crop crushing action between these surfaces. Thus it may be seen that there are provided by this roll configuration three levels of crop crushing surfaces. In addition, as the crop is bent around the corners of the lugs 6 and 6', the circular depressions 8 and 8' and the intermediate surface 5 and 5', there is also a desirable crimping action which breaks the stocks. The three-level crushing action previously described may be seen more clearly by referring to the cross-sectional views shown in FIGS. 3 through 6 in which the relationship of the various lugs and depressions may be seen at various locations along the axial length of the rolls.

Figure 3:
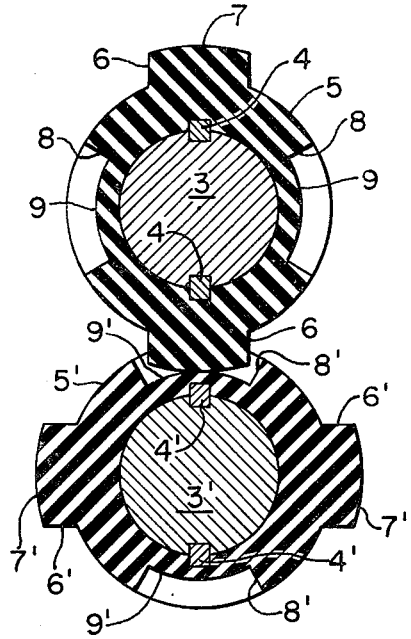
FIG. 3 is a cross-sectional view taken on line 3—3 of FIG. 1.
Figure 4:
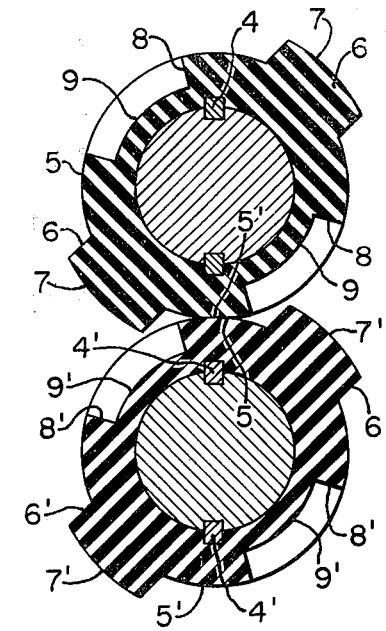
FIG. 4 is a cross-sectional view taken on line 4—4 of FIG. 1.

In FIGS. 3 through 5, the rolls 1 and 1' are in the same circumferential position. In FIG. 3 one of the lugs 6 is shown extending into one of the depressions 8'. In FIG. 4 the intermediate surface 5 is shown in contact with intermediate surface 5' and in FIG. 5, one of the lugs 6' is shown extending into one of the depressions 8.

FIG. 6 shows a fragmentary cross-sectional view which generally illustrates the relationship along a row of alternate lugs and depressions with lugs 6 extending into depressions 8' and lugs 6' extending into depressions 8 and cylindrical surfaces 5 and 5' being in contact with each other.

FIG. 6 illustrates particularly well the three levels of crushing surfaces which are an important feature of this invention.

FIG. 7 shows a flat development of one of the rolls in FIGS. 1 and 2. As shown in FIG. 7, a plurality of rows of lugs 6 extend at an angle across the flat development with each row of lugs 6 lying between a row of depressions 8 which lie at the same angle as the row of lugs 6. When the flat development is converted to a cylindrical form such as that in FIG. 1, then each row of lugs 6 and each row of depressions 8 pass around the roll 1 in a spiral of helical pattern as may be seen in FIG. 1. Similarly, the lugs 6' and depressions 8' are arranged in spiral or helical rows which are inclined at an opposite angle to the rows in the roll 1. With such a pattern, the lugs and depressions of the rolls will intermesh with each other as the rolls 1 and 2 are rotated about their axes.

Figures 8, 9:
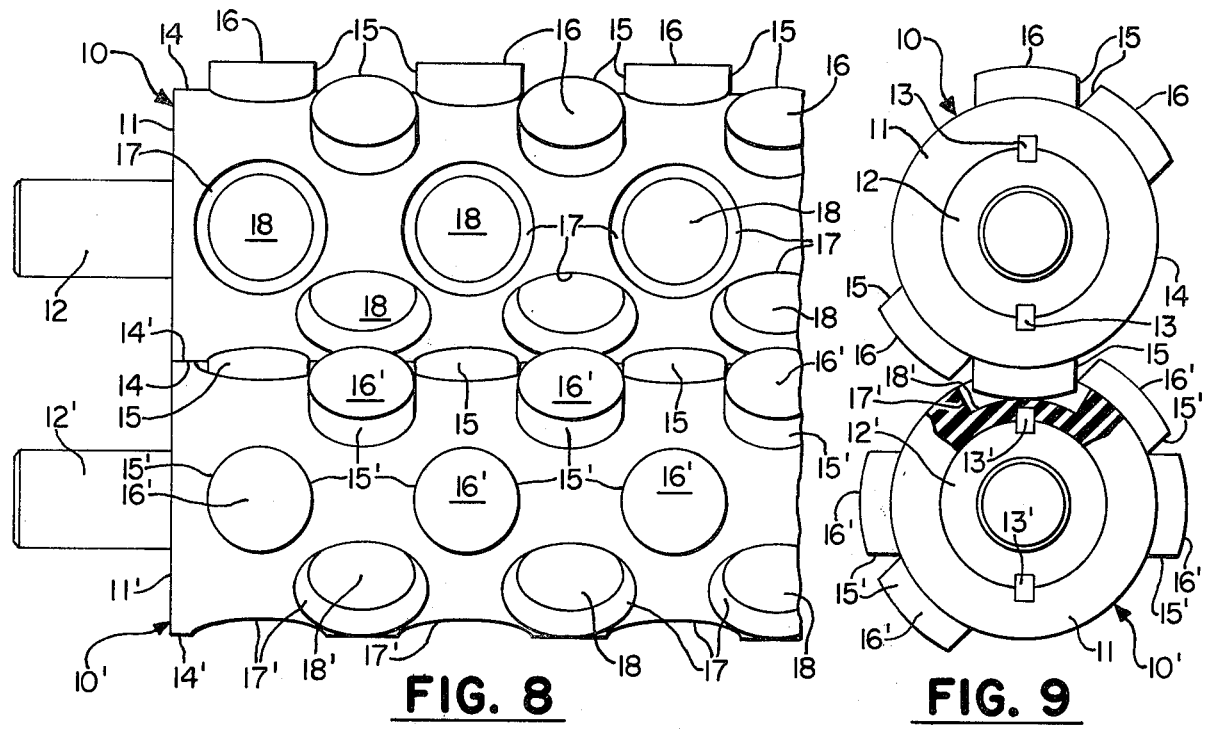
FIG. 8 is a side view of a pair of rolls similar to FIG. 1 but showing a different pattern of lugs and depressions.
FIG. 9 is an end view of the embodiment shown in FIG. 8 with a portion broken away to show the intermeshing relationship of the two rolls.
Figure 10:
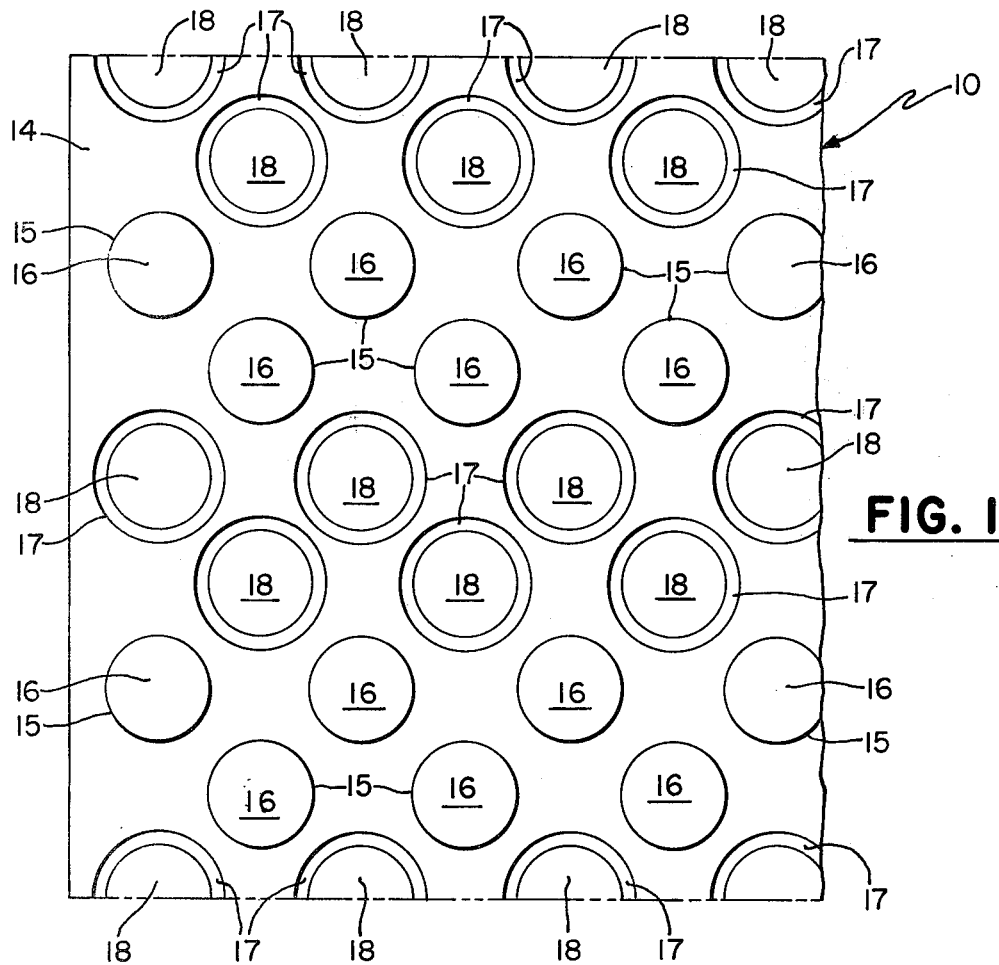
FIG. 10 is a flat development of the surface pattern of one of the rolls shown in FIG. 8.
Figures 11, 12:
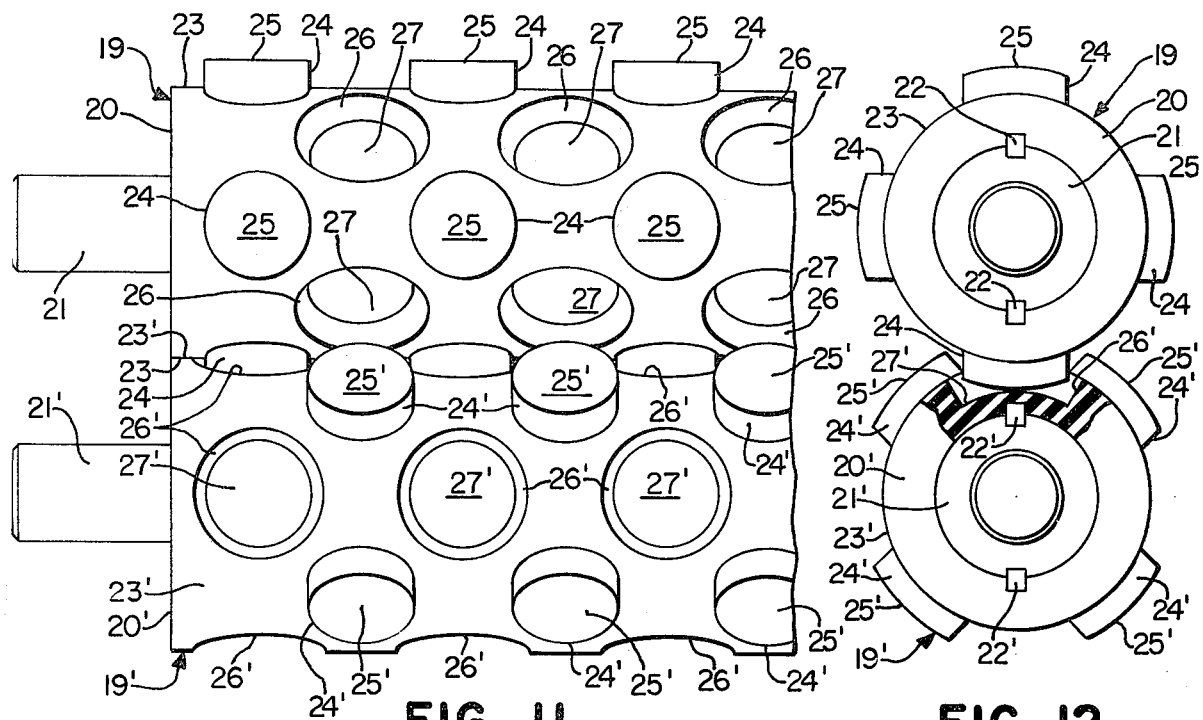
FIG. 11 is a side view showing a pair of rolls illustrating another modification of the invention.
FIG. 12 is an end view showing the embodiment illustrated in FIG. 11 with a portion broken away to show the intermeshing relationship of the two rolls.
Figure 13:
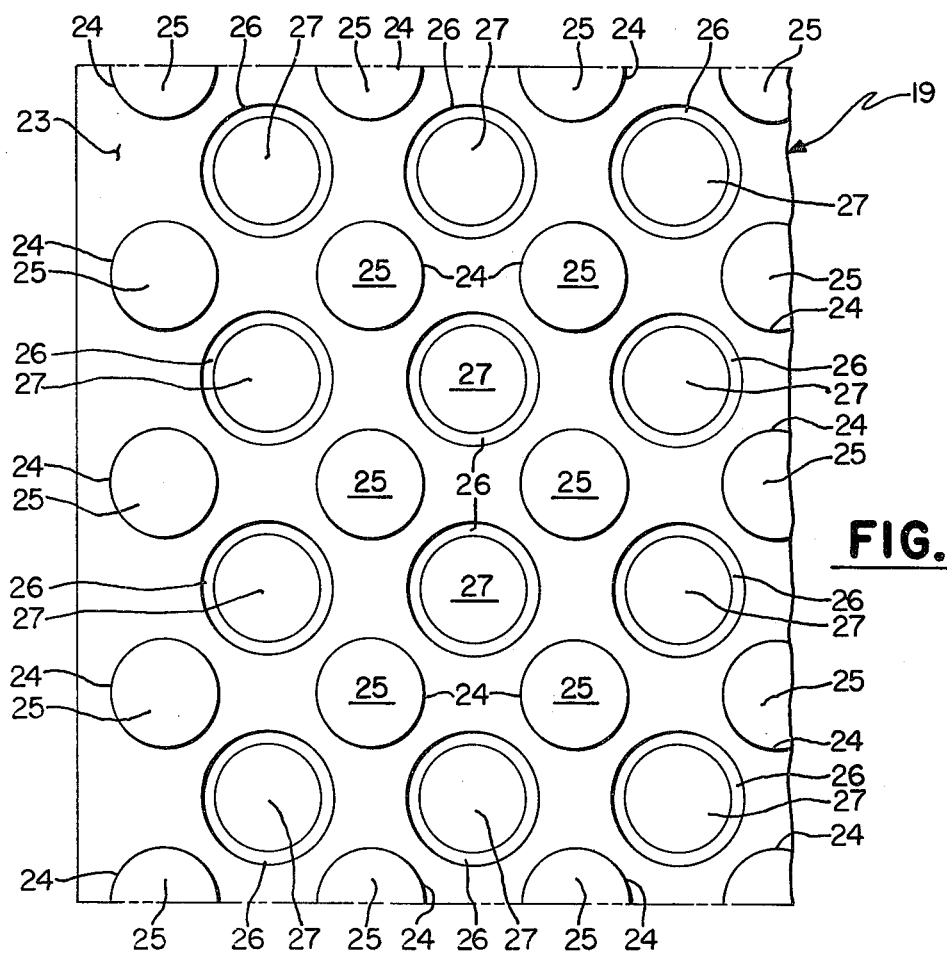
FIG. 13 is a flat development of the surface pattern of one of the rolls shown in FIG. 11.

The roll configurations shown in FIGS. 8 through 10 and in FIGS. 11 through 13 are based upon the same general principle as the embodiment described previously and shown in FIGS. 1 and 2 with the only basic difference between these two other embodiments being in the orientation of the rows of lugs and depressions.

Referring now to FIGS. 8 through 10, a pair of rolls indicated by the numerals 10 and 10' have cylindrical elastomeric body portions 11 and 11' mounted on shafts 12 and 12' and secured against rotation by keys 13 and 13' respectively. The rolls 10 and 10' have cylindrical intermediate portions 14 and 14' which are similar to the surfaces 5 and 5' previously described. The rolls have a plurality of rows of lugs 15 and 15' which have top surfaces 16 and 16'. The rolls 10 and 10' also have between the rows of lugs, rows of depressions 17 and 17' having bottom surfaces 18 and 18'. The lugs and depressions intermesh with each other in the same manner as previously except that the rows of lugs and depressions, as may be seen best in the flat development in FIG. 10, are arranged in zig-zag rows extending across the length of the roll with one zig-zag row of depressions lying between each zig-zag row of lugs.

Referring now to FIGS. 11 through 13, a pair of rolls 19 and 19' having cylindrical elastomeric body portions 20 and 20' are mounted on shafts 21 and 21' and held against rotation by keys 22 and 22'. The body portions 20 and 20' have intermediate cylindrical surfaces 23 and 23' with a plurality of rows of lugs 24 and 24' extending radially outwardly beyond the intermediate surfaces 23 and 23' with the lugs having top surface 25 and 25' respectively. Between the rows of lugs are located radially inwardly extending depressions 26 and 26' having bottom surfaces 27 and 27'. The lugs 24 and 24' are in circumferential and axial rows and the depressions 26 and 26' are also in circumferential and axial rows located between the rows of lugs 24 and 24' and offset both circumferentially and axially therefrom. The lugs and depressions are preferably arranged in such a position along the roll that they overlap each other at least in the axial direction. This provides for a continuous group of crimping edges along the length of the roll so that hay passing between the rolls at any axial location will at least be crimped by some of the crimping edges formed by the corners of the lugs 24 and 24', the depressions 26 and 26' and the intermediate surfaces 23 and 23'. The overlapping of the lugs and depressions in the axial direction is a desirable feature regardless of which lug and depression pattern is used.

The roll configuration shown in FIGS. 11 through 13 differs from the two previously described embodiments in FIGS. 1 through 10 in that the same identical roll configuration can be used for either the top or bottom roll merely by turning one of the rolls end for end so that it is opposite to the other roll. So long as the roll has the same number of lugs at it has depressions, the roll can be positioned to intermesh with another identical roll. The rolls described in FIGS. 1 through 10, however, require a different roll for the top and bottom with one being a mirror image of the other.

While three different lug and depression patterns have been shown herein to illustrate the invention, other variations in pattern orientation may be used and while circular lugs and depressions have been shown, other shapes of lugs and depressions such as diamond shapes, hexagons, rectangles and the like may also be used.

Various other modifications may be made in the embodiments shown herein without departing from the scope of the invention.

I claim:

1. A roll assembly for use on a hay conditioning machine comprising a pair of intermeshing rolls disposed in adjacent parallel relationship, each of said rolls comprising:

A. an elongated cylindrical elastomeric body portion having a peripheral surface which contacts a similar peripheral surface on the other roll as the rolls rotate;
   B. a plurality of spaced apart lugs extending radially outwardly from the peripheral surface of each roll and having a top surface;
   C. a plurality of spaced apart depressions extending radially inwardly from the peripheral surface of each roll and having a bottom surface;
   D. the relative position of the lugs on each roll being such that they correspond to the depressions in the opposite roll;
   E. the top surface of each lug contacting the bottom surface on the corresponding depression on the opposite roll as the rolls rotate;
   F. the relative positions of the lugs and depressions on the rolls being such that as the rolls rotate hay passing between them is crushed between both the contacting peripheral surfaces of the rolls and between the tops of the lugs and the bottoms of the corresponding depressions and the hay is crimped around the corners formed by the lugs, depressions and the peripheral surfaces of the rolls.

2. A roll assembly as claimed in claim 1 wherein the lugs and depressions are of circular shape about a radially extending axis.

3. A roll assembly as claimed in claim 1 wherein the lugs and depressions are aligned in heical rows extending around the rolls.

4. A roll assembly as claimed in claim 1 wherein the lugs and depressions are aligned in zig-zag rows extending along the length of the rolls.

5. A roll assembly as claimed in claim 1 wherein the lugs and depressions are aligned in circumferential and axial rows.

6. A roll assembly as claimed in claim 5 wherein a row of depressions lies between each row of lugs in both the circumferential and axial directions.

7. A hay conditioner roll for use with another roll of similar surface configuration comprising:
A. an elastomeric body portion of substantially cylindrical shape;
B. the peripheral surface of said body portion being radially offset at three different radial distances from the roll axis;
C. the offsets forming:
1. a radially inner crushing surface,
2. an intermediate crushing surface, and
3. a radially outer crushing surface;
D. the surfaces on each roll being positioned in such a pattern that when one roll is used in conjunction with another the intermediate crushing surfaces of the rolls will remain in continuous contact with each other as the rolls rotate and the radially outer surfaces of one roll will contact the radially inner surfaces of the opposite roll thereby forming three different levels at which crushing action takes place when hay is passed between the rotating rolls.

8. A hay conditioner roll as claimed in claim 7 wherein the radially inner and outer crushing surfaces are round.

9. A hay conditioner roll as claimed in claim 7 wherein the radially inner and outer crushing surfaces are aligned in helical rows extending around the rolls.

10. A hay conditioner roll as claimed in claim 7 wherein the radially inner and outer crushing surfaces are aligned in zig-zag rows extending along the length of the roll.

11. A hay conditioner roll as claimed in claim 7 wherein the radially inner and outer crushing surfaces are aligned in circumferential and axial rows.

12. A hay conditioner roll as claimed in claim 11 wherein a row of radially inner crushing surfaces lies between each row of in both circumferential and axial directions.

* * * * *